US010783419B2

(12) United States Patent
Singh

(10) Patent No.: US 10,783,419 B2
(45) Date of Patent: Sep. 22, 2020

(54) ACTIVE AND PASSIVE ASSET MONITORING SYSTEM

(71) Applicant: Seeonic, Inc., Plymouth, MN (US)

(72) Inventor: Nicholas F. Singh, Eden Prairie, MN (US)

(73) Assignee: Seeonic, Inc., Plymouth, MN (US)

( * ) Notice: Subject to any disclaimer, the term of this patent is extended or adjusted under 35 U.S.C. 154(b) by 0 days.

(21) Appl. No.: 16/460,868

(22) Filed: Jul. 2, 2019

(65) Prior Publication Data

US 2020/0042850 A1 Feb. 6, 2020

Related U.S. Application Data

(60) Provisional application No. 62/693,339, filed on Jul. 2, 2018.

(51) Int. Cl.
| | |
|---|---|
| G08B 1/08 | (2006.01) |
| G06K 19/07 | (2006.01) |
| H04B 5/00 | (2006.01) |
| G06K 7/10 | (2006.01) |
| H04B 1/38 | (2015.01) |
| H04W 52/02 | (2009.01) |

(52) U.S. Cl.
CPC ..... *G06K 19/0705* (2013.01); *G06K 7/10297* (2013.01); *H04B 1/38* (2013.01); *H04B 5/0037* (2013.01); *H04B 5/0062* (2013.01); *H04W 52/0274* (2013.01)

(58) Field of Classification Search
CPC ........... G06K 19/0705; G06K 7/10297; G06K 7/10158; G06K 19/0723; G06K 7/10207; H04B 5/0062; H04B 1/38; H04B 5/0037; H04B 1/40; H04W 52/0274; H04W 52/0261; H04W 52/0229; H04W 52/0216; G08B 21/18
USPC ........ 340/539.3, 539.26, 540, 539.12, 539.1, 340/573.1, 286.07, 571, 572.1
See application file for complete search history.

(56) References Cited

U.S. PATENT DOCUMENTS

| | | | |
|---|---|---|---|
| 6,771,972 B2* | 8/2004 | McDonnell ............. | G01S 13/74 435/9 |
| 2015/0002274 A1* | 1/2015 | Sengstaken, Jr. .. | G06K 7/10009 340/10.34 |
| 2015/0347791 A1* | 12/2015 | Desai ................. | G06K 19/0715 340/10.1 |
| 2016/0203347 A1* | 7/2016 | Bartholomew .... | G06K 7/10158 340/539.23 |

(Continued)

*Primary Examiner* — Anh V La
(74) *Attorney, Agent, or Firm* — Merchant & Gould P.C.

(57) ABSTRACT

Methods and systems for providing an asset communication system are described. One asset communication system includes an active communication subsystem including a first radio transceiver, a passive communication subsystem including a second radio transceiver configured to transmit and receive data using radio waves for communication and power, and a sensory subsystem. The sensory subsystem can include one or more sensors, for example, an ambient environment sensor. The asset communication system further includes a synchronous trigger controller for activing the active communication subsystem according to a schedule, and an asynchronous trigger controller for activating the active communication subsystem based on a signal received from a sensor or the second radio transceiver.

12 Claims, 9 Drawing Sheets

(56) References Cited

U.S. PATENT DOCUMENTS

2017/0163515 A1\* 6/2017 Heliker .................. G06F 1/263
2017/0308845 A1\* 10/2017 Henry .................. G06Q 10/087

\* cited by examiner

ACTIVE AND PASSIVE ASSET MONITORING SYSTEM

CROSS-REFERENCE TO RELATED APPLICATION

This application claims priority to U.S. Provisional Patent Application No. 62/693,339, filed Jul. 2, 2018, the disclosure of which is hereby incorporated by reference in its entirety.

BACKGROUND

Wireless communication devices, such as Internet of things (IoT) enabled devices and wireless tracking devices, can utilize a variety of communication technologies to transmit and receive data. Wireless communication devices can be attached to an asset, for example as a tag attached object. Typically, wireless communication devices for assets utilize short-range or medium-range or long-range wireless technologies, exclusively, depending on the application or the asset. However, there exist applications where assets require tracking at a long-range and medium-range and short-range, inclusively. Moreover, since many assets are mobile and cannot be wired to energy grids, the use of ultra-low-power, intelligent wakeup triggering regimes that enable long battery life is desirable.

SUMMARY

In general terms, this disclosure is directed to wireless communication devices. In some embodiments, and by non-limiting example, the wireless communication device can be a tag attached to an asset, or the wireless communication device can be an electronic module integrated with an asset.

One aspect is asset communication system comprising: an active communication subsystem including a first radio transceiver; a passive communication subsystem including a second radio transceiver configured to transmit and receive data using radio waves for communication and power; a sensory subsystem comprising at least one of: at least one ambient environment sensor, at least one electrical sensor, and at least one electromagnetic sensor; a processing subsystem comprising: a programmable circuit including at least one processor operably connected to the active communication subsystem, the passive communication subsystem and the sensory subsystem; and a memory operatively connected to the programmable circuit, the memory storing an asset communication application comprising instructions which, when executed, cause the programmable circuit to: move data from the sensory subsystem and active communication subsystem to the passive communication subsystem, and move data from the sensory subsystem and passive communication subsystem to the active communication subsystem.

Another aspect is an asset communication system comprising: a processor; an active communication subsystem comprising: a first radio transceiver; and a synchronous trigger controller configured to activate the first radio transceiver and processor according to a schedule; and a passive communication subsystem comprising: a second radio transceiver configured to transmit and receive data using radio waves for communication and power; at least one sensor; and an asynchronous trigger controller, the asynchronous trigger controller configured to activate the first radio transceiver and the processor based on a signal received from at least one of: the second radio transceiver and the at least one sensor.

A further aspect is method of controlling the battery life of an asset communication system, the method comprising: receiving at least one activation criterion; determining the frequency of the occurrence of an activation event over a predetermined period of time, the activation event being determined based on at least one signal received during the predetermined period of time satisfying the at least one activation criterion; receiving a target battery life; determining a predicted battery life based on the determined frequency of occurrence of the activation event; and adjusting the at least one activation criterion based on the predicted battery life being less than the target battery life.

Yet another aspect is an asset communication system comprising: a processor; a first radio transceiver; a synchronous trigger controller configured to activate the first radio transceiver and the processor according to a schedule; a second radio transceiver configured to transmit and receive data using radio waves for communication and power; at least one sensor; an asynchronous trigger controller configured to activate the first radio transceiver and the processor based on an event signal from at least one of: the second radio transceiver; and at least one sensor; a programmable circuit; and a memory operatively connected to the programmable circuit, the memory storing an asset identification application comprising instructions which, when executed, cause the programmable circuit to: receive an activation signal from at least one of: the synchronous trigger controller; and the asynchronous trigger controller; activate the processor and the first radio transceiver based on the activation signal received from the synchronous trigger controller; activate the processor and the first radio transceiver based on the signal received from the asynchronous trigger controller; send and receive asset data via at least one of: the first radio transceiver and the second radio transceiver.

A further aspect is a method of asset communication comprising: receiving an activation event trigger from at least one of: a synchronous trigger controller configured to activate a first radio transceiver and a processor according to a schedule; and an asynchronous trigger controller configured to activate the first radio transceiver and the processor based on an event signal from at least one of: a second radio transceiver configured to transmit and receive data using radio waves for communication and power; and at least one sensor; activating the processor and the first radio transceiver based on the received activation event trigger; and sending and receiving asset data via at least one of the first radio transceiver and the second radio transceiver.

Another aspect is an asset monitoring system for remotely monitoring the identification and state of an asset comprising: an asset tag comprising: an active communication subsystem including a first radio transceiver; a passive communication subsystem including a second radio transceiver configured to transmit and receive data using radio waves for communication and power; a sensory subsystem comprising at least one of: at least one ambient environment sensor; at least one electrical sensor; at least one electromagnetic sensor; and at least one geographic location sensor; a processing subsystem comprising: a programmable circuit including at least one processor operably connected to the active communication subsystem, the passive communication subsystem and the sensory subsystem; and a memory operatively connected to the programmable circuit, the memory storing an asset communication application comprising instructions which, when executed, cause the programmable circuit to store asset identification information including at least one identification code and at least one asset state, the asset state including data received from at least one of: the sensory subsystem, the active communication subsystem, and the passive communication subsystem; a power source; and a housing configured to be attached to an asset and house the active communication subsystem, the passive communication subsystem, the sensory subsystem, the processing subsystem and the power source; and a data evaluation subsystem arranged and configured to: receive the asset identification information and asset state information from the active communication subsystem; transmit commands to the active communication subsystem that change a configuration of the first asset tag device; and transmit automatic alerts based on the asset identification information and the asset state information.

BRIEF DESCRIPTION OF THE DRAWINGS

FIG. 7 is an image of an example dashboard of an asset monitoring system in accordance with some embodiments.

DETAILED DESCRIPTION

Figure 1:
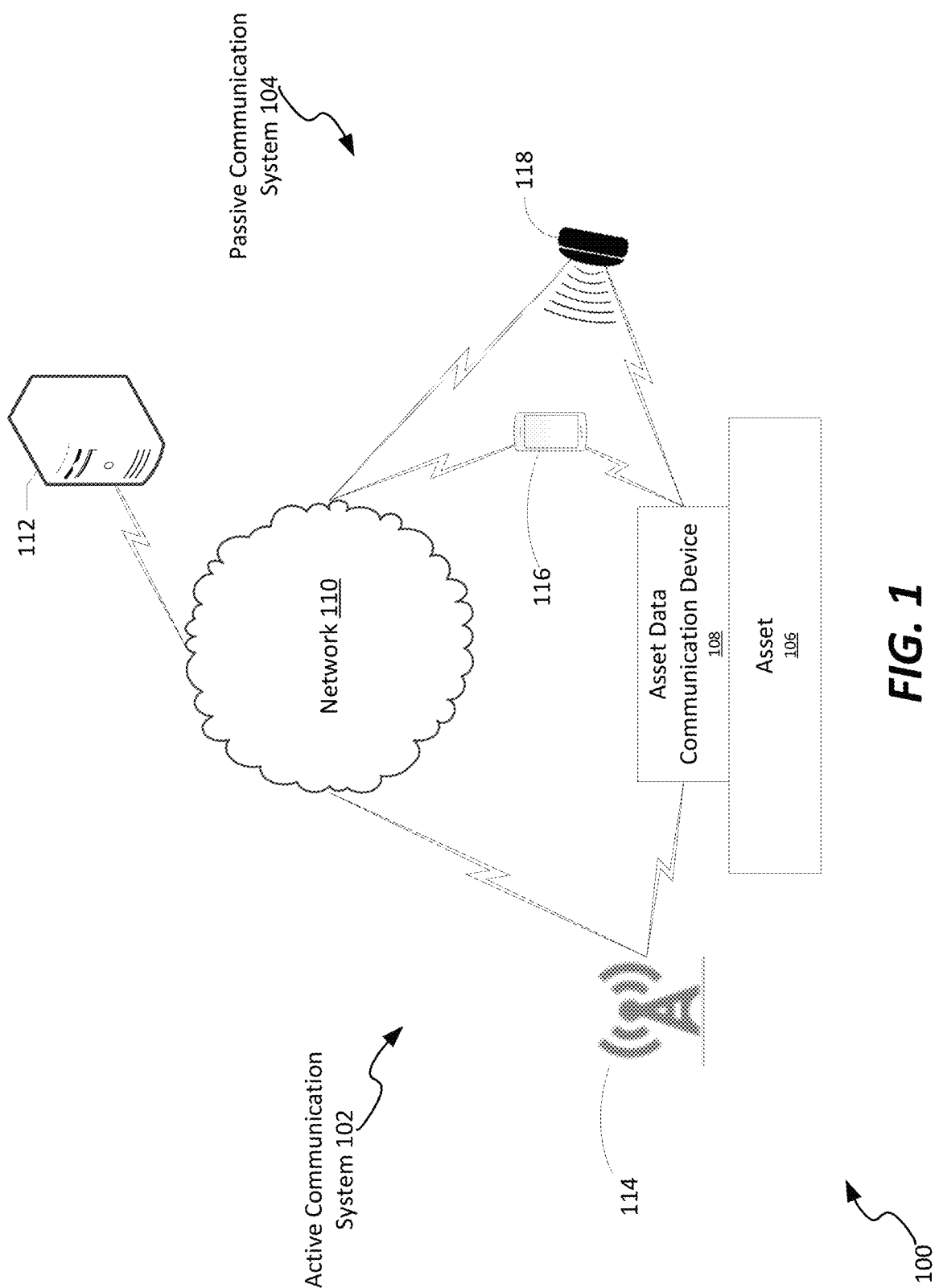
FIG. 1 is a schematic diagram illustrating an example asset management system including a wireless asset data communication device in accordance with some embodiments.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In general, the present disclosure relates to a wireless asset data communication device and a method of wireless asset data communication. The methods and systems described herein allow for wireless asset data communication via long-range, medium-range, and short-range wireless technologies using both passive and active electronic circuits. Wireless data communication technologies typically use radio waves in specific narrow-band or broad-band frequencies to transmit and receive data, however, other modalities, such as light waves or sound waves, can be used as well.

Long-range wireless communications technologies typically include those with a distance range on the order of miles, for example, those using radio communications standards such as LoRa (Long Range) spread spectrum modulation techniques using a LoRaWAN protocol, the cellular LTE-M (Long-Term Evolution Machine Type Communication) standard, and the NB-IoT (Narrowband Internet of Things) standard. In some embodiments, long-range wireless communication technologies use active, e.g. powered by a power source such as a battery, radios for radio communications and data processing operations.

Medium-range wireless communications technologies typically include those with a distance range on the order of hundreds of feet, for example, 10 feet to several hundred feet. Examples include BLE (Bluetooth Low Energy), Wi-Fi technologies and RFID (Radio Frequency Identification) UHF (ultra-high frequency) technologies. In some embodiments, medium-range wireless communication technologies can be implemented as zero-power passive technologies by using the received radio waves to power radio communications and data processing operations.

Short-range wireless communications technologies typically include those with a distance range on the order of feet or less, for example about one inch to several feet. Examples of short-range wireless communication technologies include RFID HF (high frequency) and NFC (Near-Field Communication) protocols. In some embodiments, short-range wireless communication technologies can be implemented as a zero-power passive technologies by using the received radio waves to power radio communications and data processing operations.

FIG. 1 is a schematic diagram illustrating an example asset management system 100 including a wireless asset data communication device 108 in accordance with some embodiments. In the example shown, the asset management system 100 includes an active communication system 102, a passive communication system 104, an asset 106, an asset data communication device 108, a network 110, and a server 112. Also shown in FIG. 1 are radio transceiver 114, mobile device 116, and RFID reader 118.

In the example shown, the active communication system 102 includes the asset data communication device 108, the radio transceiver 114, and the network 110. In the embodiment shown, the radio transceiver 114 is a cellular tower or a radio tower in a fixed location that can both send and receive data via long-range or medium-range wireless communication technologies, e.g. LoRa, LTE-M, NB-IoT, BLE, Wi-Fi, etc., and can connect to the network 110 to send and receive data over the network 110. In other embodiments, the radio transceiver 114 can be another asset communication device, a mobile device such as the mobile device 116, or any other device configured to send and receive data using long-range or medium-range wireless communication technologies and also connect to the network 110 and send and receive data over the network 110. In some embodiments, the data communication device 108 includes an active radio antenna and a circuit configured to send and receive data via radio waves using an antenna. The active radio antenna and circuit are powered by a power source, such as by a battery or a connection to a source of AC or DC power, and are therefore termed "active." When activated, the circuit and antenna of the asset data communication device 108 are using power from an external source to send, receive, and process data, in contrast with a passive circuit and antenna which do not need an external power source to send, receive, and process data. Further details regarding the asset data communication device 108 are described with respect to FIGS. 2 and 3 below.

The passive communication system 104 includes the asset data communication device 108, the mobile device 116, the RFID reader 118, and the network 110. In the embodiment shown, the mobile device 116 is a mobile computing device such as a smartphone, or a laptop computer, including a radio transceiver configured to send and receive data via short-range wireless communication technologies, e.g. NFC or RFID-HF, and to connect to the network 110 to send and receive data over the network 110. An example of a mobile computing device is illustrated and described in more detail with reference to FIG. 4. In some embodiments, the mobile device 116 can also include a radio transceiver configured to send and receive data via long-range and medium-range communication technologies. In the example shown, the RFID reader 118 is a handheld RFID reader including a radio transceiver configured to send and receive data via medium-range wireless communication technologies, e.g. RFID-UHF, and to connect to the network 110 to send and receive data over the network 110. In other embodiments, the RFID reader 118 is a fixed location reader for automatically tracking in/out events of the asset 106 via the asset communication device 108 moving in or out of an area or volume (e.g. a room or a truck) past a threshold, or through an opening, entrance/exit, etc., such as a reader in a service vehicle or a service dock portal reader. In other embodiments, the mobile device 116 and the RFID reader 118 can be any other device configured to send and receive data using short-range wireless communication technologies and also connect to the network 110 and send and receive data over the network 110. In the example shown, the data communication device 108 includes a passive radio antenna and a circuit configured to send and receive data via radio waves using an antenna. The passive radio antenna and circuit are powered by the radio waves received by the antenna, such as from the mobile device 116 or the RFID reader 118. In some embodiments, the passive wireless communication technology, e.g. NFC, RFID, etc., are "zero-power" such that the asset data communication device 108 receives both power and data via the radio waves send from the mobile device 116 and the RFID reader 118, and can use the received radio waves to power the passive radio antenna and circuit in order to perform communication operations, e.g. sending data and read/write operations. As such, the passive radio antenna and circuit of the asset communication device 108 do not need an external power source, such as a battery or a connection to AC or DC power, and are therefore termed "passive."

In the example shown, the asset 106 can be any object to which the asset communication device 108 can be in close proximity. In some embodiments, the asset 106 is an object to which the asset data communication device 108 can be fixably attached, and in other embodiments the asset 106 is an object within which the asset data communication device 108 is electrically and physically integrated. In other embodiments, the asset 106 is an object within which the asset data communications device 108 can be placed, such as a high-value package or shipment.

In the example shown, the network 110 can, in some cases, represent an at least partially public network such as the Internet. In the example shown, the server 112 can represent an asset management server, as well as one or more additional servers.

Figure 2:
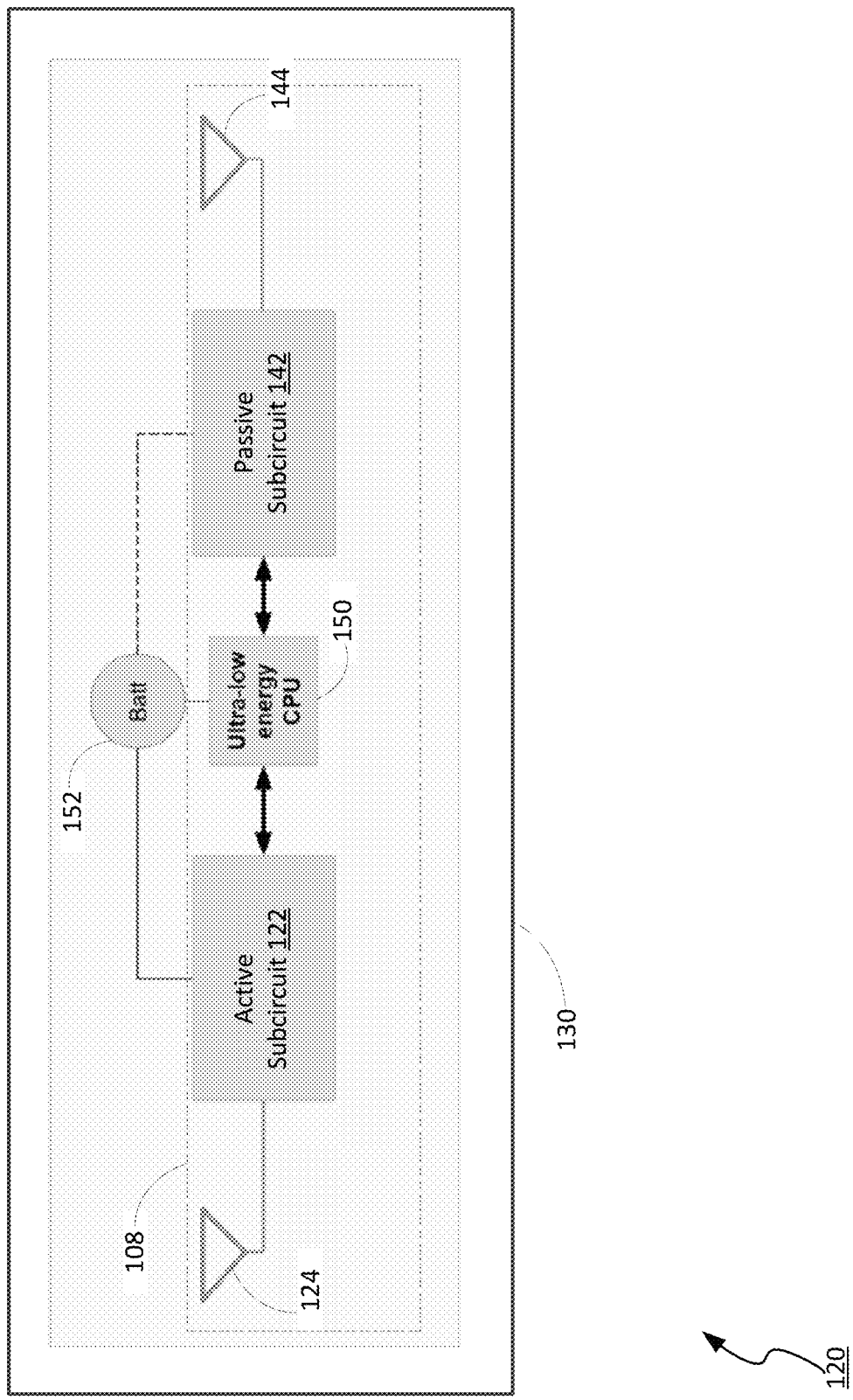
FIG. 2 is a schematic block diagram illustrating an example wireless asset data communication tag in accordance with some embodiments.

FIG. 2 is a schematic block diagram illustrating an example wireless asset data communication tag 120 in accordance with some embodiments. In the example shown, the wireless asset data communication tag 120 includes the wireless asset data communication device 108, an external power source 152, such as the battery 152 illustrated in FIG. 2, and a housing 130.

In the example shown, the wireless asset data communication device 108 includes an active antenna 124, an active sub-circuit 122, a passive antenna 144, a passive sub-circuit 142, and a processor 150. In some embodiments, the wireless asset data communication device 108 can also include memory communicatively connected to the processor 150, such as the memory 154 illustrated in FIG. 3. In some embodiments, the passive antenna 144 may include a plurality of passive antennas corresponding to different passive wireless communication technologies. In some embodiments, the passive antenna 144 can also receive power from the external power source 152, for example, in conjunction with battery assisted passive RFID to extend the range of the passive short-range communication technology being used. In some embodiments, the active antenna 124 can include a plurality of antennas corresponding to different active wireless communication technologies.

In the example shown, the active antenna 124 is communicatively connected to the active sub-circuit 122, which is communicatively connected to the processor 150. In addition, the passive antenna 144 is communicatively connected to the passive sub-circuit 142, which is communicatively connected to the processor 150. The external power source 152 in electrically connected to the processor 150 and both the active sub-circuit 122 and the passive sub-circuit 142. In the example shown, the active sub-circuit 122 receives power from the external power source 152 for its operations as well as to power the active antenna 124, and the passive sub-circuit 142 receives power from the external power source 152, as needed such as with battery-assisted passive RFID communications, for its operations as well as to power the passive antenna 144 to extend the range of the passive antenna 144.

In some embodiments, the active antenna 124 and the active sub-circuit 122 are configured to implement long-range wireless communication technologies, such as LoRa or LTE-M. LoRa is a powerful radio standard engineered to provide an ideal communications modality for IoT deployments in challenging RF environments. LoRa has robust features ideal for low-bandwidth applications including an approximate 2 mile (urban) or 10 mile (rural) range, high immunity to RF interference, superior performance within dense buildings and low cost. A benefit of LoRa is that it works well within challenging RF environments, such as large facilities that have dense structures that can be underground.

In some embodiments, the passive antenna 144 and the passive sub-circuit 142 are configured to implement medium-range wireless communication technologies, such as RFID-UHF, and can include onboard RAIN RFID compatibility. For example, any off-the-shelf RAIN RFID fixed or handheld interrogator can be used to either read or write to the wireless asset data communication device 108 via the passive sub-circuit 142 and antenna 144.

In some embodiments, the passive antenna 144 and the passive sub-circuit 142 are configured to implement short-range wireless communication technologies, such as NFC and RFID-HF, and can include onboard RAIN RFID compatibility. For example, any off-the-shelf RAIN RFID fixed or handheld interrogator or any smartphone with NFC compatibility can be used to either read or write to the wireless asset data communication device 108 via the passive sub-circuit 142 and antenna 144.

In the example shown, the processor 150 is an ultra-low energy central processing unit (CPU) coupled to both the active sub-circuit 122 and the passive sub-circuit 142. In addition, the active sub-circuit 122 and active antenna 124 can be implemented as an ultra-low energy active sub-circuit 142 and ultra-low energy antenna 144, for example, so as to function as an ultra-low energy active asset tag. In some embodiments, the wireless asset data communication device 108 can automatically synchronize all identification data between active sub-circuit 122 and the passive sub-circuit 142. In some embodiments, both the active antenna 124 and the passive antenna 144 can be planar antennas.

In the example shown, the external power source 152 is illustrated as a slimline battery 152. The external power source 152, e.g. the slimline battery 152, can provide power to the ultra-low energy active sub-circuit 122 and also provide additional range to the passive sub-circuit 142 and passive antenna 144. However, even if the external power source 152 is not present, e.g. the slimline battery 152 is low, or not present, the passive portion of the wireless asset data communication device 108, e.g. the passive sub-circuit 142 and the passive antenna 144, will still be able to be read by an interrogator, e.g. an RFID reader or NFC device.

In some embodiments the enclosure surrounding the wireless asset data communication tag 120 can be customized for particular applications. For example, the wireless asset data communication tag 120 can be arranged on the outside of the asset 106 or inside of the asset 106.

Figure 3:
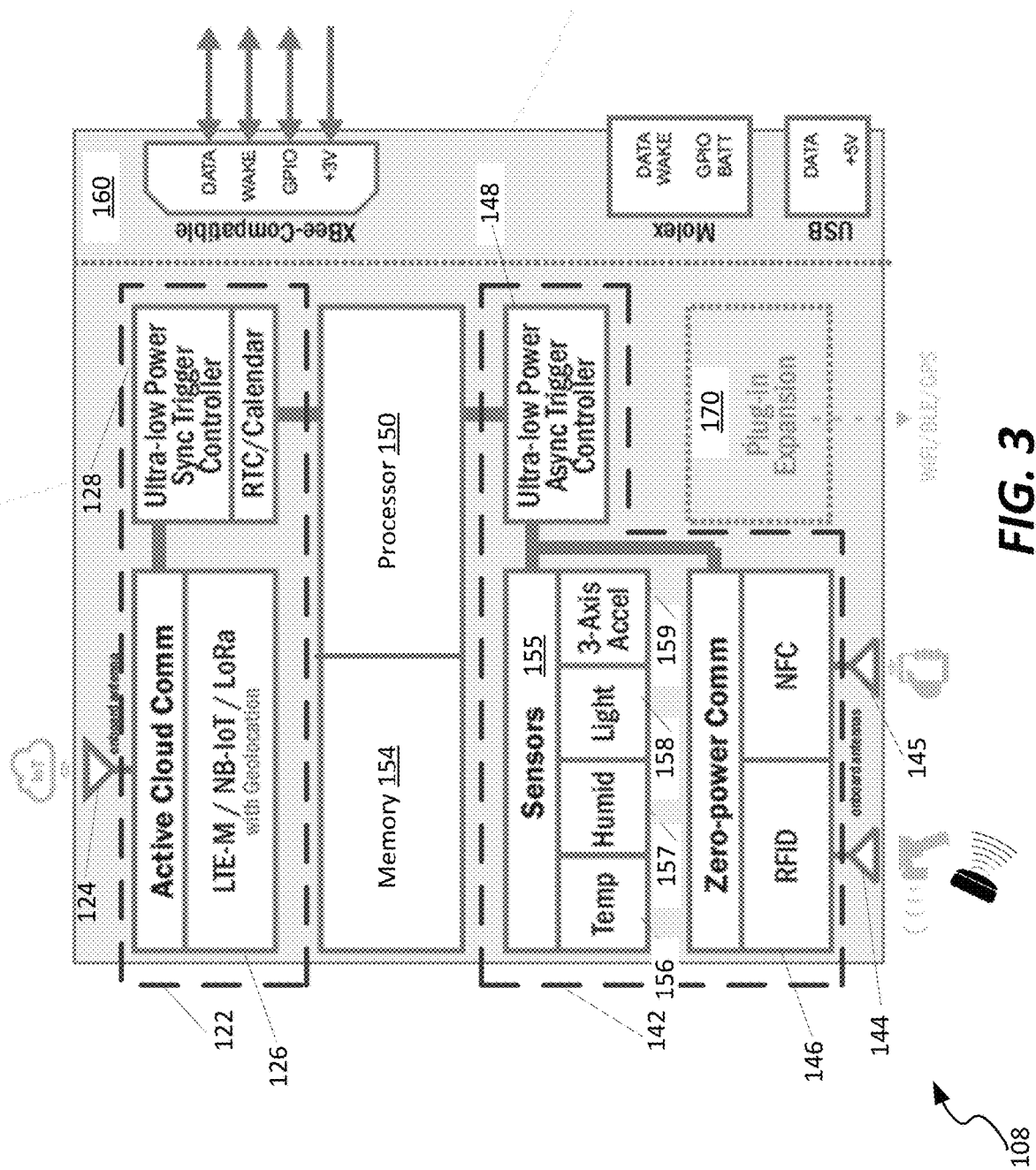
FIG. 3 is a schematic block diagram illustrating an example wireless asset data communication device in accordance with some embodiments.

FIG. 3 is a schematic block diagram illustrating an example wireless asset data communication device 108 in accordance with some embodiments. The example shown includes an active antenna 124, an active sub-circuit 122, a processor 150, a memory 154, a passive antennas 144 and 145, a passive sub-circuit 142, one or more peripheral connections 160, and a plug-in expansion 170.

In the example shown, the wireless asset data communication device 108 corresponds to the wireless asset data communication device 108 illustrated in FIG. 2 and is shown in FIG. 3 with additional detail.

In the example shown, the active sub-circuit 122 includes active communication circuitry 126 and an ultra-low power synchronous trigger controller including a real time clock. In some embodiments, the active communications circuitry 126 is configured to send and receive data via long-range communications technologies using the active antenna 124. For example, the active communications circuitry 126 can implement LoRa, LTE-M, NB-IoT, etc., communications. In some embodiments, the active communications circuitry 126 and the active antenna 124, in combination, serve as an active radio transceiver for sending and receiving data via radio waves. Additionally, in some embodiments, the active communications circuitry 126 can be configured to provide geolocation, for example, by using RF location methods such as Time Difference of Arrival, cell tower triangulation, or any other appropriate method.

In some embodiments, the ultra-low power synchronous trigger controller 128 is configured to activate the active communications circuitry 126 for sending and receiving data. For example, the active sub-circuit 122 and the processor 150 can reside in a "sleep" state, e.g. an ultra-low power state, until "woken up" to send and receive data according to a schedule. The ultra-low power synchronous trigger controller 128 can be configured to "wake up," or activate, the active sub-circuit 122 and the processor 150 for sending and receiving data according to a schedule. The schedule can be periodic, for example once every 24 hours, or can be a predetermined time or set of times and dates, or can be aperiodic. In some embodiments, the schedule can be programmed into ultra-low power synchronous trigger controller 128 and the memory 154, and can be changed via instructions received at the active or passive communications using the active sub-circuit 122 or the passive sub-circuit 142 and stored in the ultra-low power synchronous trigger controller 128 or the memory 154. In some embodiments, the ultra-low power synchronous trigger controller 128 includes a real time clock with which to implement periodic or aperiodic scheduling of activation of the active sub-circuit 122. In general, the ultra-low power synchronous trigger controller 128 is configured to activate the active sub-circuit 122 according to a deterministic schedule.

In the example shown, the passive sub-circuit 142 includes the passive communication circuitry 146, an ultra-low power asynchronous trigger controller, and one or more sensor 155. In some embodiments, the passive communications circuitry 146 is configured to send and receive data via short-range or medium-range communications technologies using the passive antennas 144 and 145. For example, the passive communications circuitry 146 can implement RFID communications using the passive antenna 144 and NFC communications using the passive antenna 145. In some embodiments, the passive communications circuitry 146 and the passive antennas 144-145, in combination, serve as a passive radio transceiver for sending and receiving data via radio waves.

In the example shown, the sensors 155 include a temperature sensor 156, a humidity sensor 157, a light sensor 158, and an accelerometer 159. In some embodiments, the sensors 155 can include a connected reed switch sensor, a mechanical contact sensor or any type of appropriate sensor. The sensors 155 are communicatively coupled to the ultra-low power asynchronous trigger controller 148 and are configured to send a signal to the ultra-low power asynchronous trigger controller 148. For example, the temperature sensor 156 can send a signal to the ultra-low power asynchronous controller 148 indicating a temperature, including temperature data and values, or a change in temperature; the humidity sensor 157 can send a signal to the ultra-low power asynchronous controller 148 indicating a humidity, including humidity data and values, or a change in humidity; the light sensor 158 can send a signal to the ultra-low power asynchronous controller 148 indicating a light level, including UV, IR, or visible light data and values, or a change in detected radiance at the sensor; and the accelerometer 159 can send a signal to the ultra-low power asynchronous controller 148 indicating that the wireless asset data communication device 108 has moved.

In some embodiments, the ultra-low power asynchronous trigger controller 148 is configured to activate the passive communications circuitry 146 for sending and receiving data. For example, the passive sub-circuit 142 and the processor 150 can reside in a "sleep" state, e.g. an ultra-low power state, until "woken up" to send and receive data according to a determined activation event. The ultra-low power synchronous trigger controller 148 can be configured to "wake up," or activate, the passive sub-circuit 142 and the processor 150 for sending and receiving data upon the determination of the occurrence of an activation event.

In some embodiments, an activation event includes a signal received at either of the passive antennas 144 or 145 indicating a read/write or other operation by an RFID reader or an NFC device. For example, an RFID reader or NFC device can interrogate the wireless asset data communication device 108 for identification or other data by sending radio waves received by the antennas 144 and 145. The antennas 144 and 145 convert the radio waves into an electrical signal, and transmit the electrical signal to the passive communication circuitry 146 which convert the electrical signal into an analog or digital electronic signal. The electronic signal can then be processed, e.g. via a programmable circuit including instructions stored in the memory 154, to determine if the electronic signal signifies an activation event, such as an interrogation by an RFID reader, or just radio wave noise or other radio wave signals not relevant to asset data communication or short-range radio communications, e.g. radio waves received by the antennas 144 and 145 that need to be filtered out and not register as an activation event.

In some embodiments, an activation event includes a signal sent by one or more of the sensors 155. For example, the accelerometer 159 can detect movement, and send an analog or digital signal that can be processed, e.g. via a programmable circuit including instructions stored in the memory 154, to determine if the electronic signifies an activation event, such as the wireless asset data communication device 108 being moved, or if the electronic signal from the accelerometer 159 represents "noise" such as a slight movement or "bump" of the wireless asset data communication device 108 that needs to be filtered out and not register as an activation event.

In some embodiments, the determination of whether a signal from the sensors 155 or the passive communication circuitry 146 is based on predetermined criteria which can be stored in the memory 154 or otherwise provided to the programmable circuit executing the instructions to make the determination. For example, the criteria can include amplitude and frequency content criteria which the programmable circuit can compare the electronic signal received by the accelerometer 159 to determine if the electronic signal represents "movement" or noise, such as a "bump," of the wireless asset data communication device 108. As another example, the criteria can include parameters for filtering and processing of the electronic signal received from the passive communication circuitry 146 to determine whether the radio waves received by the antennas 144 or 145 represent relevant data or communications with a reader.

In some embodiments, the frequency of occurrence of activation events over a predetermined period of time can be determined. For example, the number of activation events resulting from signals sent by the sensors 155 and the passive communication circuitry 146 over a period of time, e.g. an hour or less, a day, a week, a month, a year or more, etc., can be determined, e.g. by a programmable circuit including instructions stored in the memory 154, or at the server 112 based on data sent from the wireless asset data communication device 108.

In some embodiments, the power used by the wireless asset data communication device 108 results from both the scheduled activation events of the ultra-low power synchronous trigger controller 128 and the activation events of the ultra-low power asynchronous trigger controller 148; e.g. both the scheduled wake-ups from the active portion and wake-ups occurring from the sensors 155 and the passive communication circuitry 146 from the passive portion. As such, in some embodiments, for example embodiments in which the wireless asset data communication device 108 is included in a wireless asset data communication tag 120 including a battery 152, the schedule and criteria can be adjusted so as to minimize the power used over time, and thereby achieve a predetermined battery life. For example, for a schedule for activating the active sub-circuit 122 can be adjusted from every 24 hours to every 48 hours to reduce the frequency of activation events occurring from the ultra-low power synchronous trigger controller 128. In the alternative, or in addition, the criteria for determining activation events from the sensors 155 or read/write interrogations, e.g. from the passive communication circuitry, can be adjusted to reduce the frequency of activation events occurring from the ultra-low power asynchronous trigger controller 148. In some embodiments, limits to the frequency of activation of the passive sub-circuit 142 from activation signals from the ultra-low power asynchronous trigger controller 148 resulting from determined activation events can be applied in addition to, or rather than, adjusting the criteria for determining activation events from the sensors 155 or the passive communication circuitry 146. In some embodiments, the schedule or criteria can be adjusted to increase activation events.

In the example shown, the peripheral connections 160 include a XBee-compatible port, a Molex-compatible port, and a USB port. The peripheral connections 160 allow for host control of the wireless asset data communication device 108. For example, the wireless asset data communication device 108 can be directly connected to the electronics of an asset 106 through XBee, Molex, or USB connections. In the example shown, each of the XBee, Molex, and USB ports include data, "wake" or activation, power, and general purpose input/output (GPIO) connections.

In the example shown, the wireless asset data communication device 108 includes the plug-in expansion 170. The plug-in expansion 170 allows for circuitry to be added to the wireless asset data communication device 108 that includes radio transceivers for other active or passive wireless communication technologies, for example, BLE, WiFi, a geographic location sensor, such as a Global Positioning System (GPS) receiver, additional LoRa or cellular radios, etc., for example, by providing connections for such circuitry and radio transceivers. In some embodiments, the wireless asset data communication device 108 can include circuitry and radio transceivers for other active or passive wireless communication technologies. In other embodiments, the wireless asset data communication device 108 can include circuitry for other active or passive wireless communication technologies and utilize any of the antennas 124, 144, and 145. In some embodiments, any circuitry and radio transceivers added to, or included in, the plug-in expansion 170 can be communicatively connected to the processor 150 or the ultra-low power asynchronous trigger controller 148 or the ultra-low power synchronous trigger controller.

Figure 4:
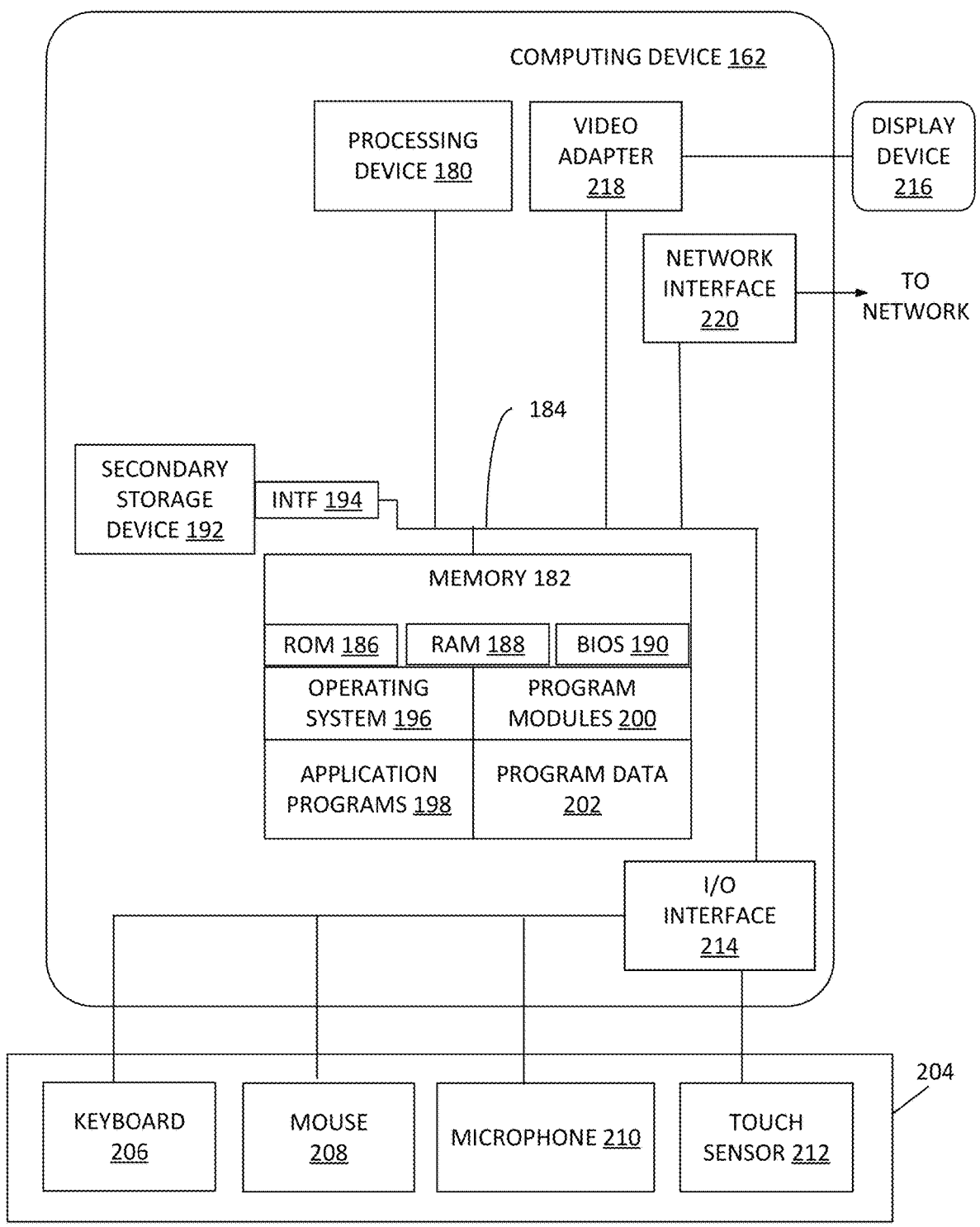
FIG. 4 illustrates an exemplary architecture of a computing device that can be used to implement aspects of the present disclosure, including any of the plurality of computing devices described herein.

FIG. 4 illustrates an exemplary architecture of a computing device 162 that can be used to implement aspects of the present disclosure, including any of the plurality of computing devices described herein. The computing device 162 illustrated in FIG. 4 can be used to execute the operating system, application programs, and software described herein. By way of example, the computing device 162 will be described below as the server 112 shown in FIG. 1. To avoid undue repetition, this description of the computing device 162 will not be separately repeated herein for each of the other computing devices, including the mobile device 116, but such devices can also be configured as illustrated and described with reference to FIG. 4.

The server 112 includes, in some embodiments, at least one processing device 180, such as a central processing unit (CPU). A variety of processing devices are available from a variety of manufacturers, for example, Intel or Advanced Micro Devices. In this example, the server 112 also includes a system memory 182, and a system bus 184 that couples various system components including the system memory 182 to the processing device 180. The system bus 184 is one of any number of types of bus structures including a memory bus, or memory controller; a peripheral bus; and a local bus using any of a variety of bus architectures.

Examples of computing devices suitable for the server 112 include a desktop computer, a laptop computer, a tablet computer, a mobile computing device (such as a smart phone, an iPod® or iPad® mobile digital device, or other mobile devices), or other devices configured to process digital instructions.

The system memory 182 includes read only memory 186 and random access memory 188. A basic input/output system 190 containing the basic routines that act to transfer information within server 112, such as during start up, is typically stored in the read only memory 186.

The server 112 also includes a secondary storage device 192 in some embodiments, such as a hard disk drive, for storing digital data. The secondary storage device 192 is connected to the system bus 184 by a secondary storage interface 194. The secondary storage devices 192 and their associated computer readable media provide nonvolatile storage of computer readable instructions (including application programs and program modules), data structures, and other data for the server 112.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 192 or memory 182, including an operating system 196, one or more application programs 198, other program modules 200 (such as the software described herein), and program data 202. The server 112 can utilize any suitable operating system, such as Microsoft Windows™, Google Chrome™, Apple OS, and any other operating system suitable for a computing device. Other examples can include Microsoft, Google, or Apple operating systems, or any other suitable operating system used in tablet computing devices.

In some embodiments, a user provides inputs to the server 112 through one or more input devices 204. Examples of input devices 204 include a keyboard 206, mouse 208, microphone 210, and touch sensor 212 (such as a touchpad or touch sensitive display). Other embodiments include other input devices 204. The input devices are often connected to the processing device 180 through an input/output interface 214 that is coupled to the system bus 184. These input devices 204 can be connected by any number of input/output interfaces, such as a parallel port, serial port, game port, or a universal serial bus. Wireless communication between input devices and the interface 214 is possible as well, and includes infrared, BLUETOOTH® wireless technology, NFC, 802.11a/b/g/n, cellular, or other radio frequency communication systems in some possible embodiments.

In this example embodiment, a display device 216, such as a monitor, liquid crystal display device, projector, or touch sensitive display device, is also connected to the system bus 184 via an interface, such as a video adapter 218. In addition to the display device 216, the server 112 can include various other peripheral devices (not shown), such as speakers or a printer.

When used in a local area networking environment or a wide area networking environment (such as the Internet), the server 112 is typically connected to the network through a network interface 220, such as an Ethernet interface. Other possible embodiments use other communication devices. For example, some embodiments of the server 112 include a modem for communicating across the network.

The server 112 typically includes at least some form of computer readable media. Computer readable media includes any available media that can be accessed by the server 112. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the server 112.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 4 is also an example of programmable electronics, which can include one or more such computing devices, and when multiple computing devices are included, such computing devices can be coupled together with a suitable data communication network so as to collectively perform the various functions, methods, or operations disclosed herein.

Figure 5:
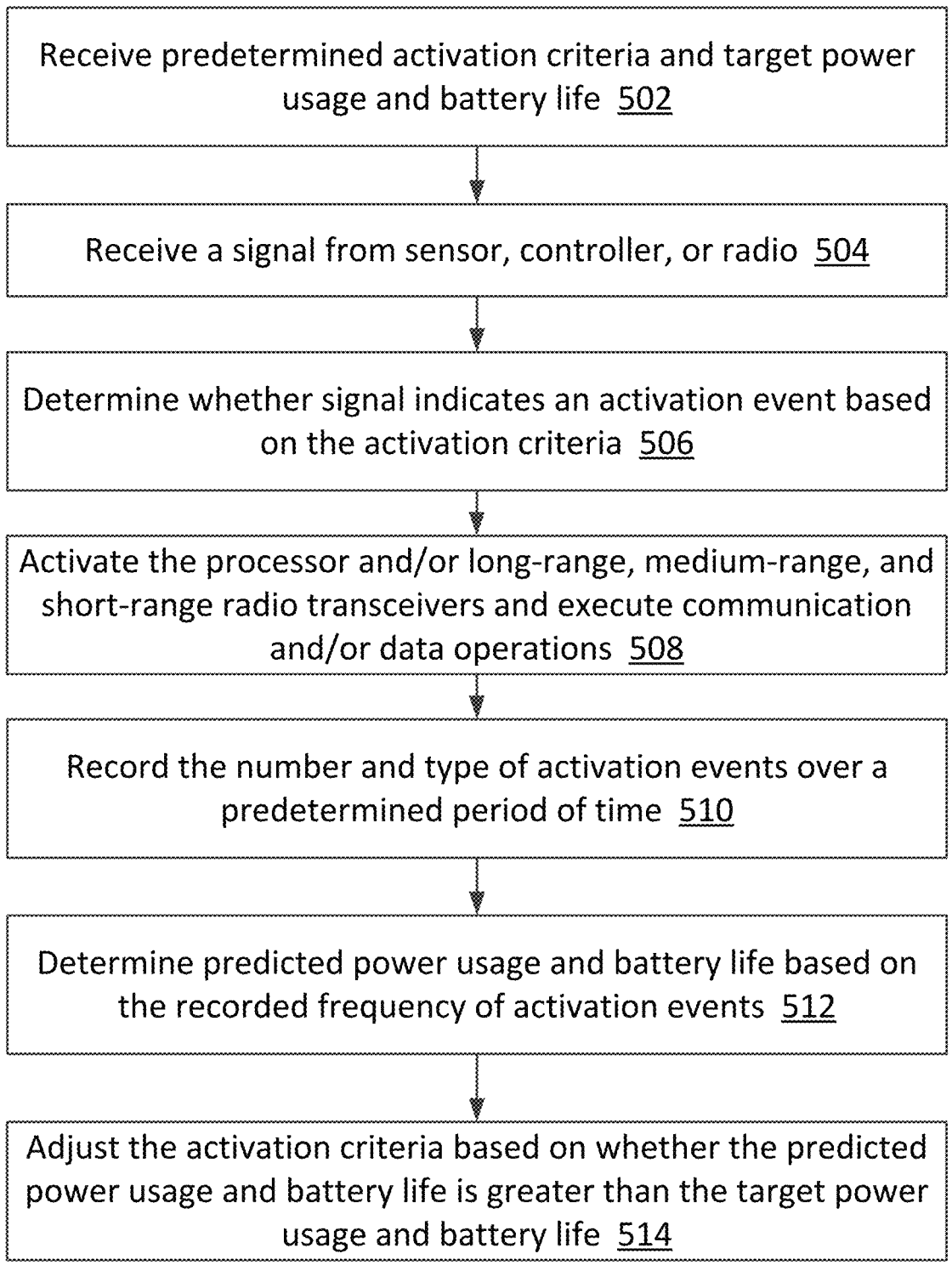
FIG. 5 is a flow chart illustrating an example method of wireless data communication in accordance with some embodiments.

FIG. 5 is a flow chart illustrating an example method 500 of wireless data communication in accordance with some embodiments. The method 500 analyzes signals sent from radio transceivers and sensors to determine whether wireless communications are to be activated based on criteria and to adjust the criteria to satisfy a predetermined power usage or battery life target, or target value.

In the example shown, the method 500 includes receiving a predetermined activation criteria and target power usage and battery life at step 502. The activation criteria can include criteria regarding the sensors 155 and the active sub-circuit 122 and the passive sub-circuit 142. For example, the activation criteria can include the amplitude and frequency content, or other attributes of a signal from the accelerometer 159, the temperature or temperature change or difference from a temperature sensor 156, the humidity or humidity change or difference from a humidity sensor 157, the radiance, luminescence, wavelength and spectral content, polarization, or other attributes of a signal from the light sensor 158, the acceleration amplitude or change or event interpretation of tilt, drop, tap or orientation change from the 3-axis accelerometer 159, attributes of radio waves received by the active antenna 124 and the passive antenna 144 and 145, and attributes signals received from peripheral connections 160 or the plug-in expansion 170. The activation criteria can also include a schedule for activation, e.g. a period or aperiodic specification of when an activation event is to be generated to activate the wireless asset data communication device 108.

In the embodiment shown, the method 500 includes receiving a signal from one or more sensors 155, the ultra-low power asynchronous trigger controller 148, the ultra-low power synchronous trigger controller 128, the active sub-circuit 122, or the passive sub-circuit 142 at step 504. The signal can be an analog or digital signal, and can be in response to a sensor 155 sensing a physical occurrence or state, e.g. temperature or temperature change, motion, light or a change in light, movement or change in movement, orientation or change in orientation, etc., or an antenna receiving radio waves such as a medium-range RFID reader interaction or a short-range NFC smartphone interaction.

In the embodiment shown, the method 500 includes determining whether the received signal indicates an activation event based on the predetermined activation criteria at step 506. Determination of whether the received signal indicates an activation event can include comparing the received signal to the activation criteria and any appropriate processing steps, for example, filtering and pre- and/or post-processing of the signal.

In the embodiment shown, the method 500 includes activating the processor and/or long-range, medium-range, and short-range radio transceivers and executing communication and/or data operations at step 508. Data operations can include, for example, sending and receiving asset data via the active antenna 124, the passive antenna 144 or 145, or the peripheral connections 160, sending and receiving asset identification and state information, receiving and executing commands that change the configuration of the wireless asset data communication device 108, sending automatic alerts based on asset information and data and asset state information and data, adjusting scheduled activation events, adjusting predetermined criteria, adjusting activation event frequency thresholds, changing the power usage and batter lift targets, changing the predetermined period of time for determining activation event frequency, etc.

In the example shown, the method 500 includes recording the number and type of activation events over a predetermined period of time at step 510. At step 512, a predicted power usage of the wireless asset data communication device 108 and battery life based on the recorded frequency of activation events is determined.

In the embodiment shown, the method 500 includes adjusting the activation criteria based on whether the predicted power usage and battery life is greater than the target power usage and battery life at step 514.

FIGS. 6-9 illustrate an example asset monitoring system 600 including at least one wireless asset data communication tag 120. The examples of FIGS. 6-9 are presented in the context of delivery, transport, and storage of oxygen tanks, e.g. assets 106, for acute healthcare needs, and include delivery vehicles and locations such as hospitals.

Although the examples presented in FIGS. 6-9 illustrate one example application involving oxygen tank tracking, the concepts disclosed herein also apply to other applications. In some embodiments the disclosure is directed to one or more of: a tracking system, a tracking device, an identification system, and an identification device.

The examples shown illustrate an example transport oxygen product 607. The products can include integrated, portable medical gas regulators that are permanently attached to a medical gas cylinder 606. These systems require no extra parts which allows for easy use and storage. Reordering is also streamlined by offering these products within a service model. Additionally, the cylinders 606 and/or the transport oxygen products 607 have the ability to measure the amount of gas remaining via either a mechanical or digital gauge. Such products and services can be deployed at hundreds of hospitals and other healthcare facilities. Such business success can simultaneously generate operational challenges in the pursuit of efficient, quality services. Such challenges can include the ability to precisely track hospital tank inventory, leading to inaccurate service billing, the necessity for in-person hospital or facility visits to search for and evaluate the status of hospital or facility inventory, increasing operational overhead, and the lack of the ability to proactively identify and replace partially-filled or empty tanks, impacting quality of service. In the examples presented, it is desired that products be tracked automatically.

In some embodiments, the asset monitoring system 600 can provide the ability to scale rapidly and economically to many different facilities or hospitals. In some embodiments, the asset monitoring system 600 can include affixing wireless asset data communication tags 120 to a plurality of oxygen transport products, and interfacing those tags to additional oxygen cylinder systems for additional data (such as tank level). In some embodiments, collecting, storing and analyzing data from the asset monitoring system 600 can be accomplished on a cloud platform, such as the SEENIQ® cloud platform from Seeonic, Inc.

Figure 6:
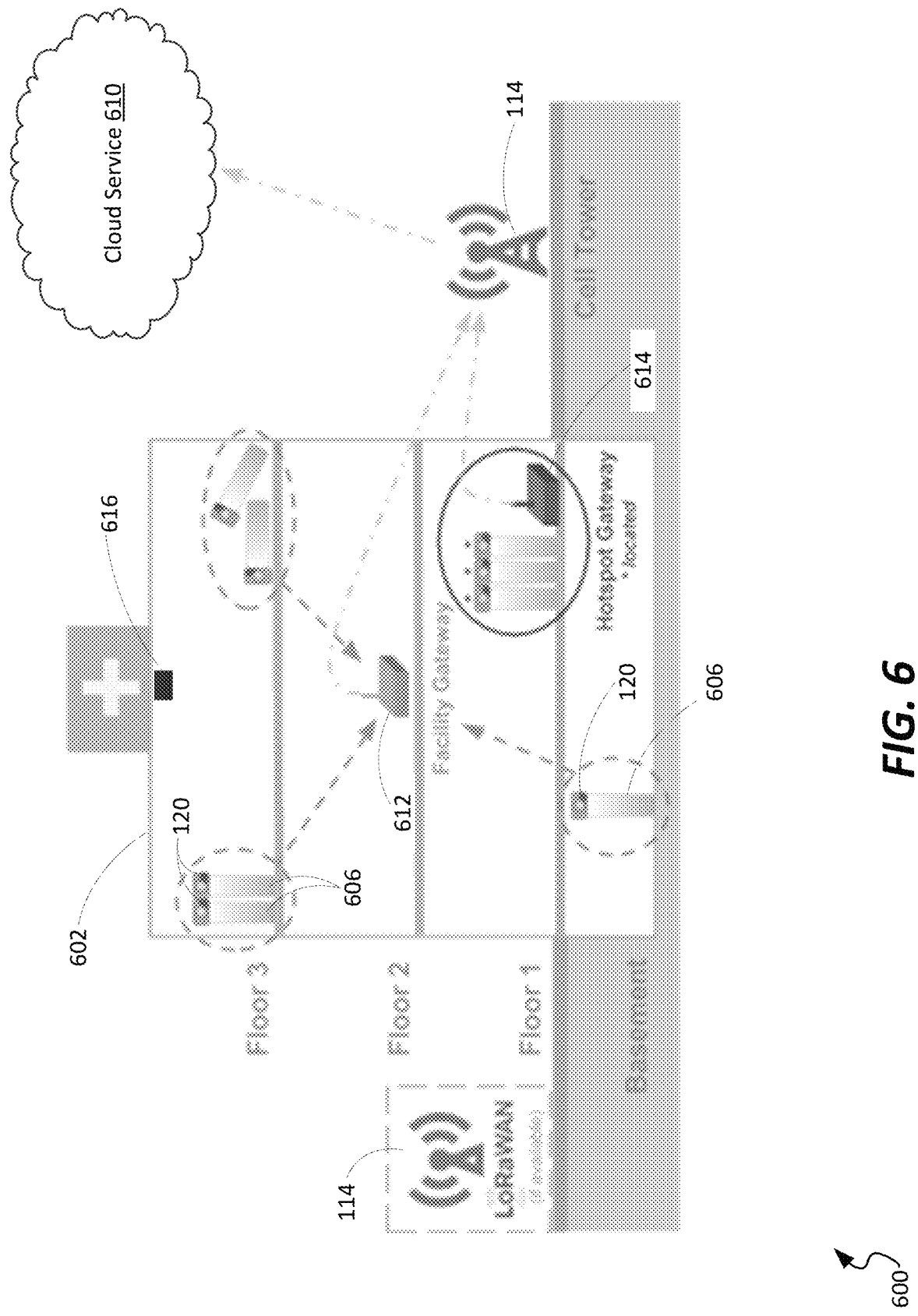
FIG. 6 is a schematic diagram illustrating an example asset monitoring system including at least one wireless asset data communication tag in accordance with some embodiments.

FIG. 6 is a schematic diagram illustrating an example asset monitoring system 600 including at least one wireless asset data communication tag 120 in accordance with some embodiments. In the example shown, the asset monitoring system 600 includes a facility 602, a cloud service 610, the radio transceivers 114, a facility gateway 612, a hotspot gateway 614, assets 606, and wireless asset data communication tags 120. In some embodiments, the asset monitoring system illustrated includes at least one wireless asset data communication device 108, for example, instead of the at least one wireless asset data communication tag 120.

In some embodiments, the facility 602 can be a building, hospital, or other location. In the example shown, the facility is a hospital 602. In some embodiments, the hospital 602 can be harsh radio frequency (RF) environment, or portions of the hospital 602 can be harsh RF environments, for example, dense structures that can be underground and include conductive structures that interfere with radio wave communication.

In the example shown, a plurality of oxygen tanks 606 are located within the hospital 602. A wireless asset data communication tag 120 is attached to each of the plurality of oxygen tanks 606. In some embodiments, when cylinders enter the hospital 602, they are read by a LoRa transceiver 114. In some embodiments, it may be possible to utilize a city or regional LoRaWAN network. In other embodiments, a city or regional LoRaWAN network may not be available, and a facility gateway 612 is deployed in the hospital 602.

In the example shown, the facility gateway 612 can connect directly to the cloud service 610 via cellular communications, e.g. 3G/4G-LTE cellular communications. In lieu of, or in addition to, a LoRa connection between the wireless asset data communication tags 120 and a LoRa transceiver 114, the facility gateway 612 can connect to the wireless asset data communication tags 120 to send and receive asset data, and transmit the data via a secure connection, for example, a secure TCP/IP-based communication protocol to the cloud service 610. In some examples, the cloud service 610 is hosted over a network, such as the network 110.

In some embodiments, the facility gateway 612 is configured to be plugged in to a power source, such as an electrical wall outlet, and can also, or alternatively, have a battery backup option. In some embodiments, the facility gateway 612 does not need access to any local hospital 602 networks, which can allow for rapid deployment of the asset monitoring system 600 nationwide by obviating coordination with facility IT departments and security audits and firewalls.

In some embodiments, a single centrally-positioned facility gateway 612 is used within the hospital 602. In other embodiments, a plurality of facility gateways 612 can be used within the hospital 602. In the example shown, each facility gateway 612 can be encoded with a location ID and can locate wireless asset data communication tags 120 as being within the hospital 602.

In some embodiments, the asset monitoring system 600 includes the hotspot gateway 614. The hotspot gateway 614 is a facility gateway 612 placed within a select location, such as a dock door or storage room, to locate wireless asset data communication tags 120 with greater precision and accuracy. In some embodiments, a wireless asset data communication tags 120 near a hotspot gateway 614, e.g. within several feet, will have a very high signal strength, in which case the cloud service 610 can locate that wireless asset data communication tags 120 as being near the respective hotspot gateway 614. In the example shown, each hotspot gateway 614 can be encoded with a facility ID and a "room" ID, allowing the cloud service 610 to more specifically locate the cloud service 610.

In some embodiments, the wireless asset data communications tag 120 can be configured to receive wireless signals from one or more beacon communications tags 616. In some embodiments, a beacon communications tag 616 is a wireless asset data communications tag 120 in a fixed location that can receive wireless signals and also transmit wireless signals based on a schedule or a received command. In some examples, each beacon communication tag 616 has an identification code that associates the beacon communication tag 616 with a location. In some examples, the wireless asset data communication tag 120 can receive data wirelessly from a beacon communication tag 616 and determine a received signal strength indication (RSSI) or other electromagnetic measure that is proportional to a distance separating the wireless asset data communication tag 120 from the beacon communication tag 616. In some embodiments, the wireless asset data communication tag 120 can determine the associated location information and identification code of the beacon communication tag 616 and thereby determine the location of the wireless asset data communication tag 120, for example, such as being located in a building and proximate to the beacon communication tag 616. In some embodiments, if several beacon communication tags 616 are detected by the wireless asset data communications tag 120, the wireless asset data communication tag 120 can determine the location of the beacon communications tag 616 with the highest RSSI or highest electromagnetic measure, which can then be used to determine the location of the wireless asset data communication tag 120.

In some embodiments, the asset data communication tag 120 can be configured such that it is able to receive medium-range signals from existing hospital infrastructure such as BLE or WiFi. These signals can be used to locate an asset within a building 602.

In some embodiments, the asset data communications tag 120 can be configured such that it is able to send or receive data from long-range wireless communications technologies such as LTE-M cellular.

In some embodiments, the asset monitoring system 600 can locate the wireless asset data communication tags 120 using geolocation, as described above in more detail with respect to FIG. 3.

Figure 7:
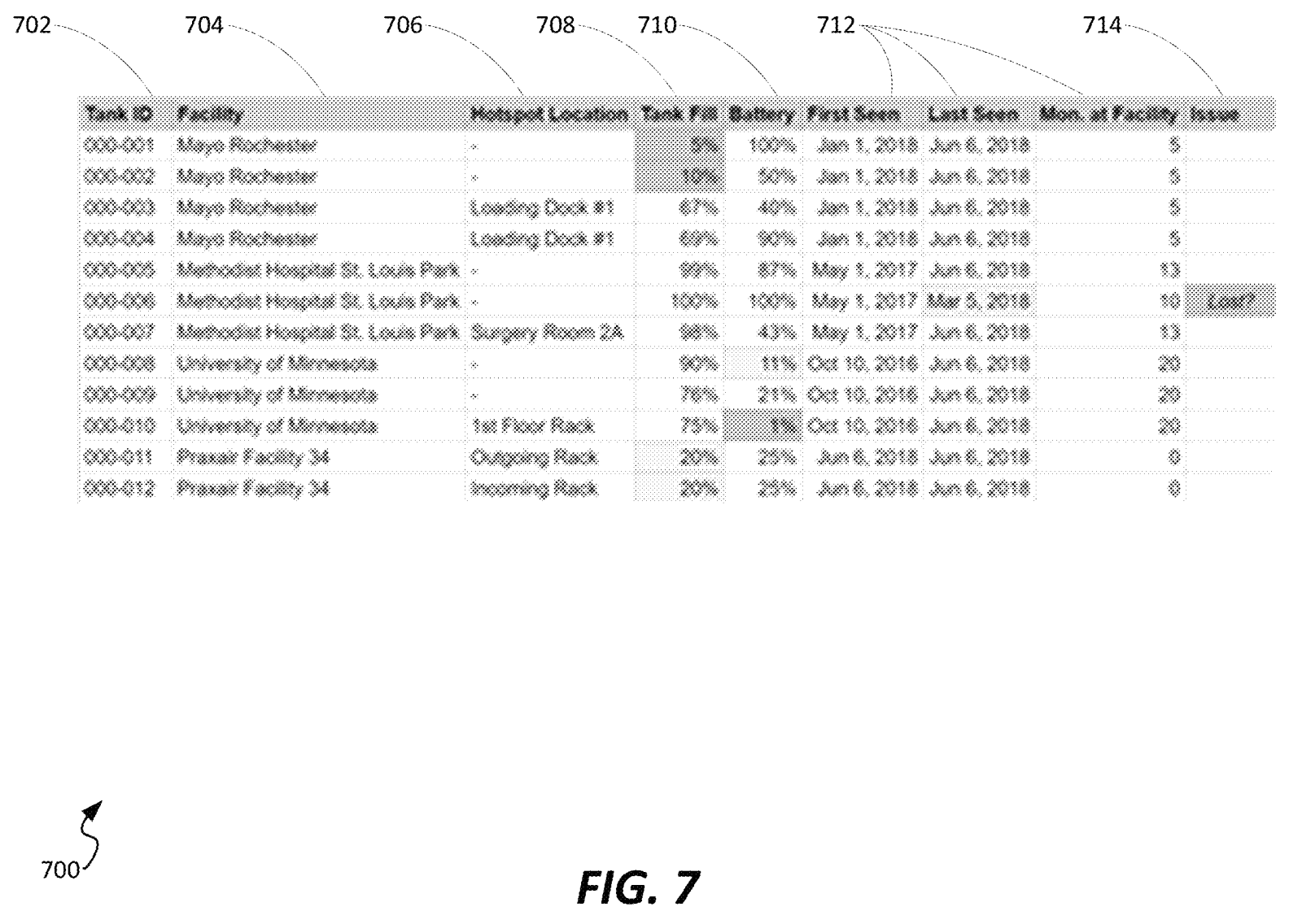

FIG. 7 is an image of an example dashboard 700 of an asset monitoring system 600 in accordance with some embodiments. The dashboard 700 can be displayed, for example, by a computing device such as the mobile computing device 116, the server 112, or any other computing device. In the example shown, the dashboard 700 can include an asset ID 702, a facility name or ID 704, a hotspot location 706, asset data or information 708, a battery level 710, transport and storage data 712, and additional information or data 714. In some embodiments, the dashboard can be customized based on specific operational and business requirements to display more or fewer categories than are illustrated in FIG. 7. In some embodiments, data and information for asset monitoring can be presented as graphical visualizations and include predictive and prescriptive analytics. In some embodiments, data and information for asset monitoring can be presented via email, text alerts, social media posts, etc., in addition to the dashboard 700.

Figure 8:
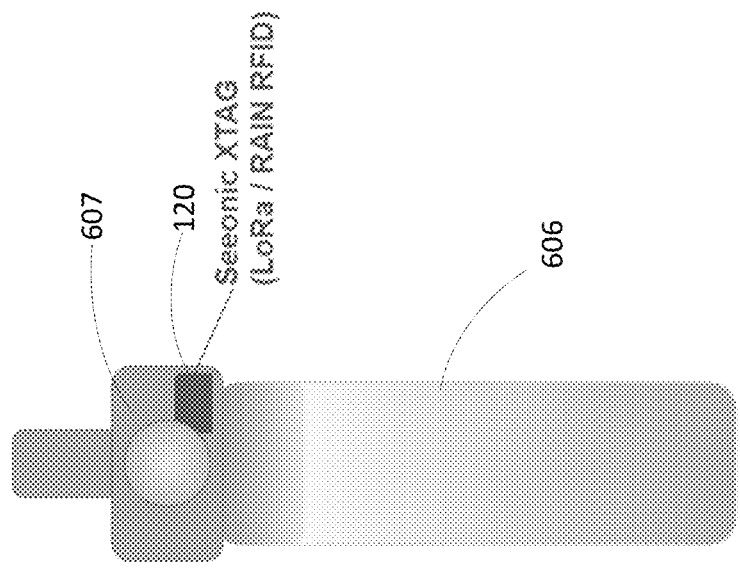
FIG. 8 is a schematic diagram illustrating an example asset including a wireless asset data communication tag in accordance with some embodiments.

FIG. 8 is a schematic diagram illustrating an example asset 607 including a wireless asset data communication tag 120 in accordance with some embodiments. The example shown in FIG. 8 illustrates a wireless asset data communication tag 120 fixably attached to the transport oxygen product 607, which is attached to the oxygen cylinder 606.

In some embodiments, the transport oxygen product 607 includes a digital display and electronics that can include asset information, for example, the pressure or amount of oxygen in the oxygen tank 606 that the transport oxygen product 607 is attached to. In some embodiments, the wireless asset data communication device 108 can be within the housing of the transport oxygen product 607, and can be integrated with the electronics of the transport oxygen product 607, for example, via the peripheral connections 160, so as to be able to read asset information from the transport oxygen product 607 electronics, e.g. the pressure or amount of oxygen in the oxygen tank 606. Asset data can be stored in the memory 154, and transmitted or received by the active sub-circuit 122, the passive sub-circuit 142, the plug-in expansion 170, or the peripheral connections 160.

In some embodiments, the transport oxygen product 607 includes a mechanical gauge, and the wireless asset data communication tag 120 can be located and fixably attached to the outside of the transport oxygen product 607 housing.

Figure 9:
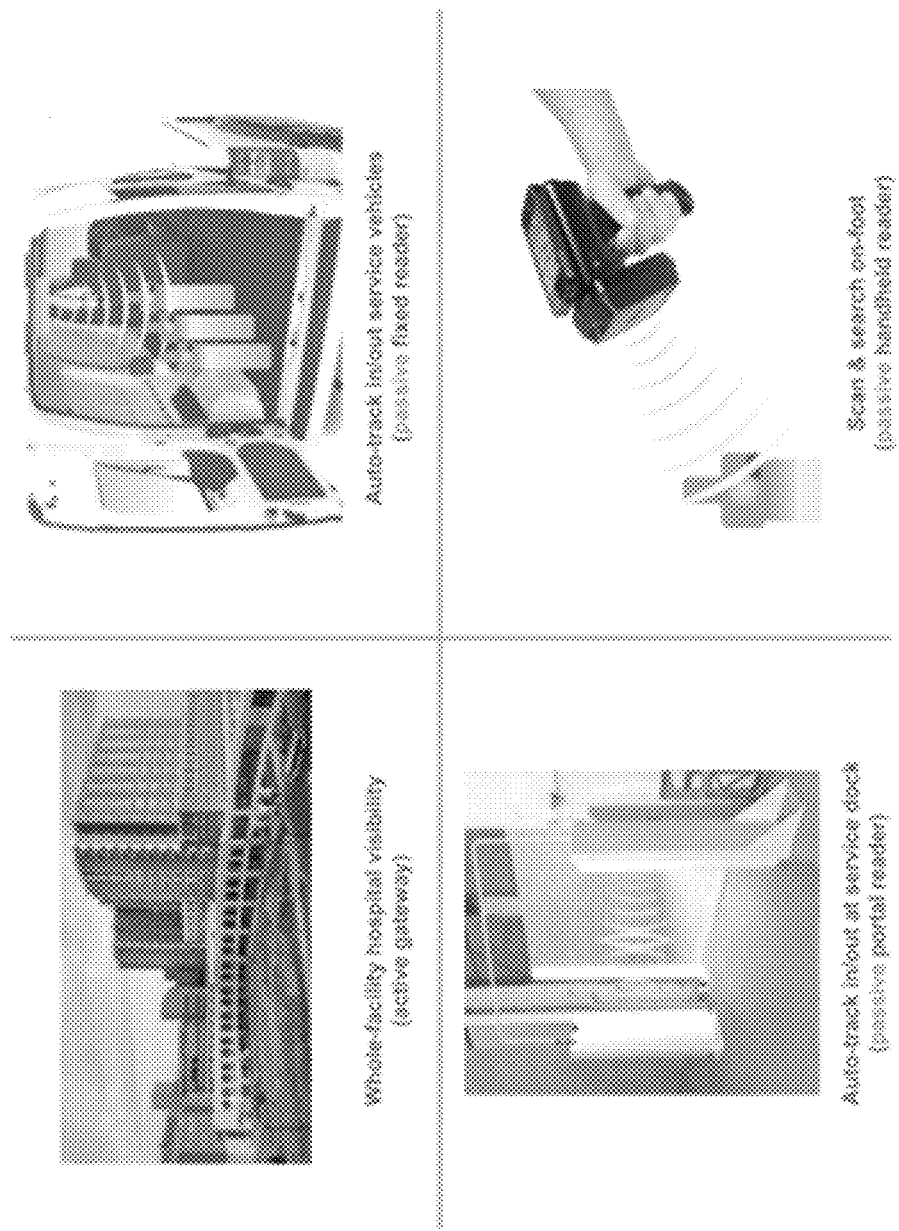
FIG. 9 is a schematic diagram illustrating example environments in which an asset monitoring system can be used in accordance with some embodiments.

FIG. 9 is a schematic diagram illustrating example environments in which an asset monitoring system 600 can be used in accordance with some embodiments. The example shown in FIG. 9 illustrates a facility-wide environment in which a facility gateway 612 can be used, automatic tracking of the movement in and out of a service vehicle of an asset 106 including a wireless asset data communication tag 120 via a passive fixed reader 118 fixed on or in the vehicle, automatic tracking of movement in and out of a service dock of an asset 106 including a wireless asset data communication tag 120 via a passive portal reader 118, and scanning a wireless asset data communication tag 120 attached to an asset 106 with a hand-held RFID reader 118. FIG. 9 illustrates the passive/active and long-range to short-range communication cross-functionality of the wireless asset data communication tag 120 and the wireless asset data communication device 108.

In the examples illustrated in FIGS. 6-9, the asset monitoring system 600 including the wireless asset data communication device 108 and the wireless asset data communication tag 120 can provide long-range, robust, automatic visibility for oxygen units 606 in hospitals 602 and field facilities 602 in challenging RF environments without need to install extensive hospital infrastructure. In some embodiments, the wireless asset data communication device 108 and the wireless asset data communication tag 120 can include passive RAIN RFID communication capability, enabling medium-range visibility with supply chain operations, such as fixed readers 118 to auto-scan the cylinders 606 in/out of service vehicles, portal readers 118 at dock doors to auto-monitor the in/out transfer of cylinders 606 at a service facility 602, handheld readers 118 to track cylinders 606 at a unit level, e.g. as "seek mode" or "Geiger counter" mode in hospitals 602 or service facilities 602. Moreover, smartphones with NFC capabilities can be used to identify and/or configure the tag in short-range scenarios.

In addition, the examples illustrated in FIGS. 6-9, the asset monitoring system 600 including the wireless asset data communication device 108 and the wireless asset data communication tag 120 can provide enterprise-wide automation with active/passive cross-functionality including active LoRa technology or LTE-M cellular technology for long-range field visibility, and passive RAIN RFID technology for medium-range reading and NFC-enabled smartphones for short-range reading. In some embodiments, the RAIN RFID feature can be used to further digitize and streamline operational supply and service chain such as auto-scanning the cylinders 606 that pass in/out of a service facility dock, service vehicle, etc.

In the examples shown, the asset monitoring system 600 can also provide robust RF performance with a flexible architecture, including a range of several miles and incorporate robust communications protocols designed to withstand the rigors of use in complex RF environments and within deep, dense structures, and dynamic tuning of locatability requirements to each hospital 602 without adding extra complexity.

In the examples shown, the asset monitoring system 600 can also provide an alternative to reliance on existing hospital infrastructure, such as legacy communications systems, e.g. WiFi or Bluetooth, while still maintaining the option of utilizing such legacy communications systems.

In the examples shown, the asset monitoring system 600 can also provide use of LoRa and cellular networks without the need to interact or use hospital networks or the need for special permission or security coordination as required by hospital facility IT departments.

In the examples shown, the asset monitoring system 600 can also provide smaller, cost-effective tags. In some embodiments, the wireless asset data communication device 108 and the wireless asset data communication tag 120 can be smaller and more cost-effective than other "no infrastructure" approaches such as cellular asset tags, require less infrastructure overhead cost as compared with WiFi or Bluetooth communication devices, and be more energy efficient than comparable technology. For example, in some embodiments the wireless asset data communication tag 120 can have a battery life of 5 years or more on a battery that is smaller with less capacity than comparable technologies and asset tags.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An asset communication system comprising:
   an active communication subsystem including a first radio transceiver;
   a passive communication subsystem including a second radio transceiver configured to transmit and receive data using radio waves for communication and power;
   a sensory subsystem comprising at least one of:
      at least one ambient environment sensor,
      at least one electrical sensor, and
      at least one electromagnetic sensor;
   a processing subsystem comprising:
      a programmable circuit including at least one processor operably connected to the active communication subsystem, the passive communication subsystem and the sensory subsystem; and
      a memory operatively connected to the programmable circuit, the memory storing an asset communication application comprising instructions which, when executed, cause the programmable circuit to:
         move data from the sensory subsystem and active communication subsystem to the passive communication subsystem, and
         move data from the sensory subsystem and passive communication subsystem to the active communication subsystem.

2. The asset communication system of claim 1, wherein the first radio transceiver is configured to transmit and receive at least one of LoRa radio signals, WiFi radio signals, Bluetooth radio signals, SigFox radio signals, LPWAN radio signals and cellular radio signals.

3. The asset communication system of claim 1, wherein the second radio transceiver is configured to transmit and receive NFC radio signals and RFID radio signals.

4. The asset communication system of claim 1, wherein the at least one electromagnetic sensor includes at least one of a light sensor and a GPS sensor; and wherein the at least one ambient sensor includes at least one of: a temperature sensor, a humidity sensor, and an accelerometer.

5. An asset communication system comprising:
a processor;
an active communication subsystem comprising:
   a first radio transceiver; and
   a synchronous trigger controller configured to activate the first radio transceiver and processor according to a schedule; and
a passive communication subsystem comprising:
   a second radio transceiver configured to transmit and receive data using radio waves for communication and power;
   at least one sensor; and
   an asynchronous trigger controller, the asynchronous trigger controller configured to activate the first radio transceiver and the processor based on a signal received from at least one of: the second radio transceiver and the at least one sensor.

6. The asset communication system of claim 5, wherein the asynchronous trigger controller is configured to determine an occurrence of an event and activate the first radio transceiver and the programmable circuit upon the determination of the occurrence of the event, wherein the determination of the occurrence of the event is based on the received signal satisfying at least one predetermined criterion.

7. The asset communication system of claim 6, wherein the at least one predetermined criterion is automatically adjusted to maintain a predetermined battery life.

8. The asset communication system of claim 5, wherein the asset identification system is an asset tag, and wherein the asset tag further comprises:
a source of power; and
a housing.

9. The asset tag of claim 8, wherein the power source is a battery, and wherein the passive communication subsystem is configured to transmit and receive data without power from the battery.

10. The asset tag of claim 8, wherein the at least one predetermined criterion is automatically adjusted to maintain a predetermined battery life.

11. An asset communication system comprising:
a processor;
a first radio transceiver;
a synchronous trigger controller configured to activate the first radio transceiver and the processor according to a schedule;
a second radio transceiver configured to transmit and receive data using radio waves for communication and power;
at least one sensor;
an asynchronous trigger controller configured to activate the first radio transceiver and the processor based on an event signal from at least one of:
   the second radio transceiver; and
   at least one sensor;
a programmable circuit; and
a memory operatively connected to the programmable circuit, the memory storing an asset identification application comprising instructions which, when executed, cause the programmable circuit to:
   receive an activation signal from at least one of:
      the synchronous trigger controller; and
      the asynchronous trigger controller;
   activate the processor and the first radio transceiver based on the activation signal received from the synchronous trigger controller;
   activate the processor and the first radio transceiver based on the signal received from the asynchronous trigger controller;
   send and receive asset data via at least one of: the first radio transceiver and the second radio transceiver.

12. An asset monitoring system for remotely monitoring the identification and state of an asset comprising:
an asset tag comprising:
   an active communication subsystem including a first radio transceiver;
   a passive communication subsystem including a second radio transceiver configured to transmit and receive data using radio waves for communication and power;
   a sensory subsystem comprising at least one of:
      at least one ambient environment sensor;
      at least one electrical sensor;
      at least one electromagnetic sensor; and
      at least one geographic location sensor;
   a processing subsystem comprising:
      a programmable circuit including at least one processor operably connected to the active communication subsystem, the passive communication subsystem and the sensory subsystem; and
      a memory operatively connected to the programmable circuit, the memory storing an asset communication application comprising instructions which, when executed, cause the programmable circuit to store asset identification information including at least one identification code and at least one asset state, the asset state including data received from at least one of: the sensory subsystem, the active communication subsystem, and the passive communication subsystem;
   a power source; and
   a housing configured to be attached to an asset and house the active communication subsystem, the passive communication subsystem, the sensory subsystem, the processing subsystem and the power source; and
a data evaluation subsystem arranged and configured to:
   receive the asset identification information and asset state information from the active communication subsystem;
   transmit commands to the active communication subsystem that change a configuration of the first asset tag device; and
   transmit automatic alerts based on the asset identification information and the asset state information.

* * * * *